United States Patent
Gupta

(10) Patent No.: US 9,299,320 B1
(45) Date of Patent: Mar. 29, 2016

(54) PROVIDING VISUAL FEEDBACK ON A DISPLAY

(71) Applicant: Amazon Technologies, Inc., Reno, NV (US)

(72) Inventor: Siddharth Gupta, San Bruno, CA (US)

(73) Assignee: Amazon Technologies, Inc., Seattle, WA (US)

( * ) Notice: Subject to any disclaimer, the term of this patent is extended or adjusted under 35 U.S.C. 154(b) by 45 days.

(21) Appl. No.: 14/185,771

(22) Filed: Feb. 20, 2014

(51) Int. Cl.
*G09G 5/10* (2006.01)
*G06F 3/041* (2006.01)
*G09G 3/34* (2006.01)

(52) U.S. Cl.
CPC *G09G 5/10* (2013.01); *G06F 3/041* (2013.01); *G09G 3/344* (2013.01)

(58) Field of Classification Search
CPC ............... G06F 3/041–3/0414; G06F 3/044; G09F 3/3433–3/3473
See application file for complete search history.

(56) References Cited

U.S. PATENT DOCUMENTS

| | | | | |
|---|---|---|---|---|
| 2012/0092395 A1* | 4/2012 | Seetzen | | 345/690 |
| 2012/0133673 A1* | 5/2012 | Ninan | | 345/690 |
| 2013/0135215 A1* | 5/2013 | Bozarth et al. | | 345/173 |
| 2014/0125602 A1* | 5/2014 | Chen | | 345/173 |

* cited by examiner

*Primary Examiner* — Nathan Danielsen
(74) *Attorney, Agent, or Firm* — Lee & Hayes, PLLC

(57) ABSTRACT

Techniques for providing visual feedback on a display of an electronic device by sequentially and/or independently controlling the illumination of the lighting output by the display. In some implementations, the techniques may be employed following an interaction with the device having one or more light source controllers instructing one or more light sources, such as Light Emitting Diodes (LEDs), in a lighting apparatus, such as for a display which renders content on the device. For instance, a lightguide of the lighting apparatus may sequentially receive light from the one or more light sources as directed by the one or more light source controllers and may direct the light to provide illumination for a display. In some cases, the display may be a reflective display that is front-lit by the lighting apparatus. In other cases, the display may be a backlit display that is backlit by the lighting apparatus.

21 Claims, 9 Drawing Sheets

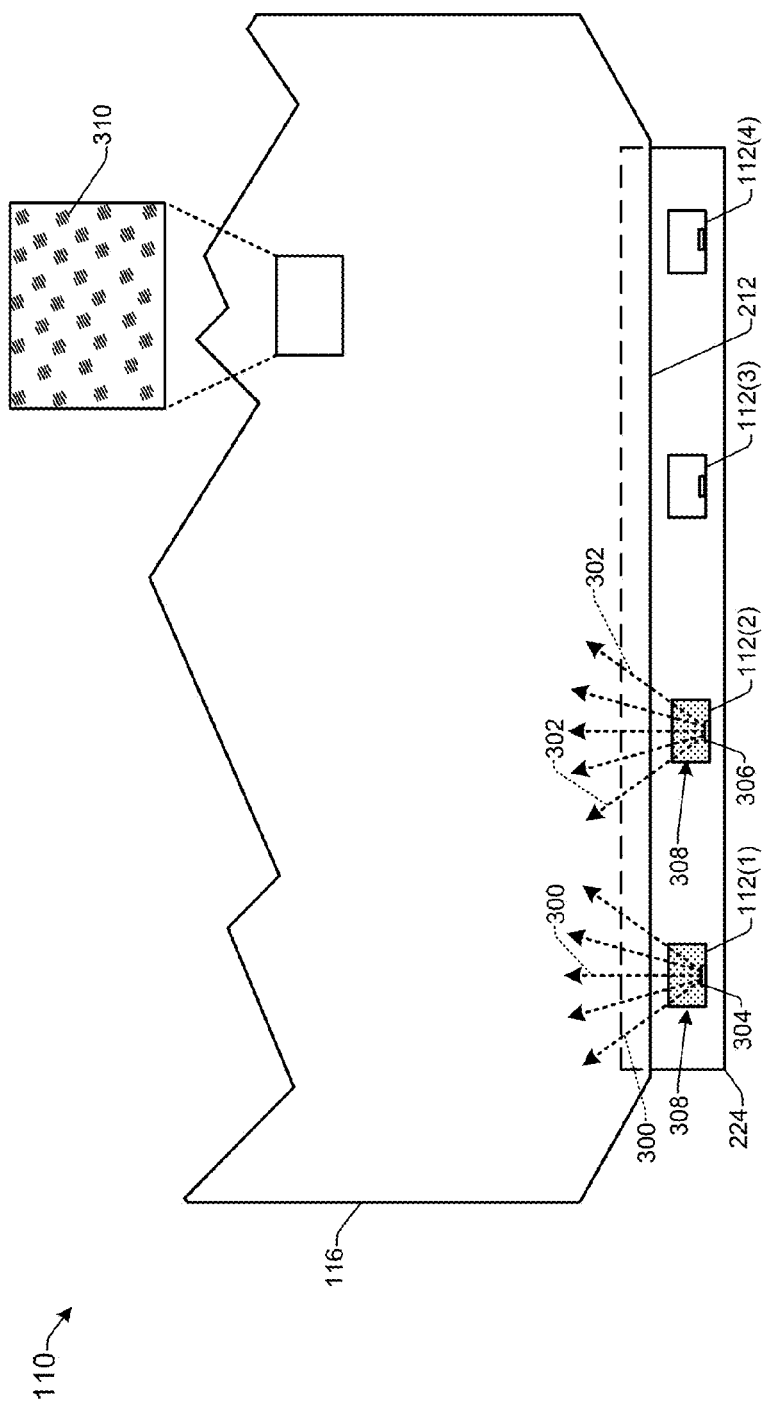

PROVIDING VISUAL FEEDBACK ON A DISPLAY

BACKGROUND

A large and growing population of users employs various electronic devices to consume digital content, such as music, movies, images, electronic books, and so on. Among these electronic devices are electronic book (eBook) reader devices, cellular telephones, desktop computers, portable media players, tablet computers, netbooks, and the like. Often these electronic devices incorporate illuminated display technology. One problem with using such devices is that in some situations the devices are unable to provide a visual indication in response to an input on the device, thereby creating user confusion as to whether the input was recognized by the device. As such, finding ways to increase the functionality of such devices and thus enhancing a user's experience continues to be a high priority

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 illustrates a partial plan view of a lighting apparatus having one or more light sources.

DETAILED DESCRIPTION

Figure 1:
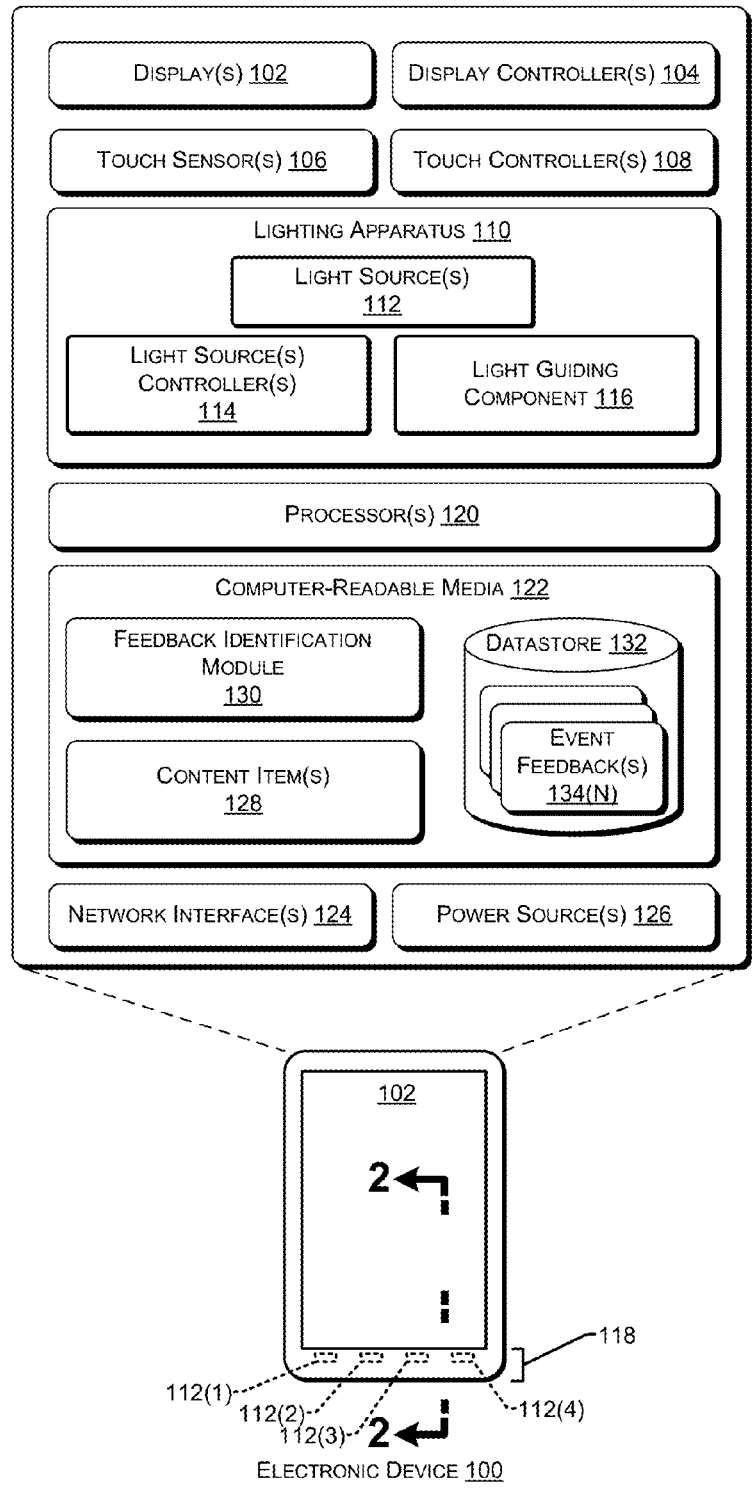
FIG. 1 illustrates an example electronic device that includes a lighting apparatus and functionality to provide a visual feedback by one or more light sources.

This disclosure describes, in part, techniques for providing visual feedback on a display of an electronic device by sequentially and/or independently controlling the illumination of the lighting output by the display. In some implementations, the techniques may be employed following an interaction with the device having one or more light source controllers instructing one or more light sources, such as Light Emitting Diodes (LEDs), in a lighting apparatus, such as for a display which renders content on the device. For instance, a lightguide of the lighting apparatus may sequentially receive light from the one or more light sources as directed by the one or more light source controllers and may direct the light to provide illumination for a display. In some cases, the display may be a reflective display that is front-lit by the lighting apparatus. In other cases, the display may be a backlit display that is backlit by the lighting apparatus.

Traditionally, when a user requests that an electronic device having an illuminated display (e.g., front-lit display or back-lit display) render a new piece of content, the one or more light sources of the lighting apparatus receives a single instruction or single line of instructions from a light source controller of the device to uniformly illuminate the new piece of content. Generally, the one or more light sources are controlled by a light source controller that is unable to control the light sources independent of another light source of the device. As a result, the one or more light sources of the lighting apparatus are unable to be activated independent of another light source and, thus, cannot provide a visual feedback that the user request was received by the device. In contrast, the techniques described below may allow the one or more light sources to be independently controlled by one or more light source controllers. As such, the techniques provide visual feedback that a user request was received.

To illustrate, envision that a user reading an electronic book on an electronic device requests to turn from a first page of the electronic book to a second page by touching an area of the display. In response, the one or more light source controllers may initiate visual feedback that the request was received. In some implementations, the visual feedback includes a series of instructions that alters the one or more light sources in a particular order. For instance, the one or more light source controllers may instruct the light sources to suspend illumination of the display starting on the from a left side of the display moving sequentially toward the right side.

In other implementations, the controllers may alter the lights sources in another way (e.g., heighten or boost illumination) and/or within a predetermined timeframe (e.g., less than 300 miliseconds). In some implementations, the controllers may alter the activation of one light source to overlap with the activation of another adjacent light source in order to give the appearance that the light is cascading across the screen in a particular direction.

Collectively, the instructions from the one or more light source controllers to the light sources may give the visual feedback of a progressive motion across the display, in contrast to a single content update of "flash" on the display, which is often undetected by a user of the device. For instance, if the user request for new content is a page turn request in an electronic book, the instructions for the one or more light source controllers may cycle through each of the one or more light source from right to left, left to right, top to bottom, or bottom to top depending on the positioning of the light source and the direction of the requested page turn.

The techniques of providing visual feedback by sequentially illuminating light sources as described herein may be implemented in a variety of ways and by a variety of electronic devices. While a few examples are illustrated and described below, it is to be appreciated that other electronic devices may implement any similar or different display configurations and visual feedback. Furthermore, it is noted that because electronic books are structured as virtual frames presented on a computing device, the term "page" as used herein refers to a collection of content presented at one time on a display. Thus, "pages" as described herein are not fixed permanently, and may be refined or repaginated based on variances in display conditions, such as screen size, font type or size, margins, line spacing, resolution, or the like.

In addition, the term "electronic book", "eBook", or "content item" as used herein, may include any type of content which can be stored and distributed in digital form. By way of illustration, and without limitation, electronic books and content items can include all forms of textual information such as books, magazines, newspapers, newsletters, periodicals, journals, reference materials, telephone books, anthologies, proceedings of meeting, forms, directories, maps, manuals, guides, references, photographs, articles, reports, documents, etc., and all forms of audio and audiovisual works such as music, multimedia presentations, audio books, movies, etc.

FIG. 1 illustrates an example electronic device 100 configured to implement the visual feedback discussed above. The device 100 may comprise any type of electronic device having one or more displays 102. For instance, the device 100 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 100 may be a non-mobile electronic device (e.g., a computer display, a television, an appliance, a cash register, etc.). In addition, while FIG. 1 illustrates several example components of the electronic device 100, it is to be appreciated that the electronic device 100 may also include other conventional components, such as an operating system, system busses, input/output components, and the like. Further, in other examples, such as in the case of a television or computer monitor, the electronic device 100 may only include a subset of the components shown.

Regardless of the specific implementation of the electronic device 100, the device 100 may include the one or more displays 102 and corresponding display controllers 104. The one or more displays 102 may represent a reflective display in some instances, such as an electronic paper displays, a reflective liquid crystal displays (LCDs), and/or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display. Some examples of the one or more displays 102 that may be used with the implementations described herein include bi-stable LCD displays, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of devices 100, the displays 102 may include an active display such as a liquid crystal display, a plasma display, a LED display, an organic LED display, and so forth. For example, the lighting apparatus 110 herein may be used to front-light or backlight one or more displays. Accordingly, implementations herein are not limited to any particular display technology. Further, in addition to displays, the lighting apparatus 110 herein can be used to light other types of surfaces, other types of components, and may be further used for signs, lighting panels, and so forth.

In one implementation, the one or more displays 102 comprise an electrophoretic display that moves particles between different positions to achieve different color shades. For instance, when a pixel is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the display absorbs the incident light and, hence, causes the pixel to appear black to a viewing user. In addition, the particles may situate at varying locations between the front and rear sides of the display to produce varying shades of gray. Furthermore, as used herein, a "white" pixel may comprise any shade of white or off white, while a "black" pixel may similarly comprise any shade of black.

In another implementation, the one or more displays 102 comprise an electrophoretic display that includes oppositely charged light and dark particles. In order to create white, the display controller moves the light particles to the front side of the display by creating a corresponding charge at an electrode near the front and moves the dark particles to the back of the display by creating a corresponding charge at an electrode near the back. In order to create black, meanwhile, the controller changes the polarities and moves the dark particles to the front and the light particles to the back. Furthermore, to create varying shades of gray, the display controller 104 may utilize different arrays of both light and dark particles. In some cases, the particles may be contained in tiny individual transparent capsules, such as approximately 40 micrometers in diameter. The capsules are suspended in a fluid, such as a liquid polymer, between a transparent upper electrode grid layer and a lower electrode grid layer separated by a gap, such as approximately 50-200 micrometers.

In still another implementation, the one or more displays 102 may comprise an electrowetting display that employs an applied voltage to change the surface tension of a liquid in relation to a surface. For instance, by applying a voltage to a hydrophobic surface, the wetting properties of the surface can be modified so that the surface becomes increasingly hydrophilic. As one example of an electrowetting display, the modification of the surface tension acts as an optical switch by contracting a colored oil film when a voltage is applied to individual pixels of the display. When the voltage is absent, the colored oil forms a continuous film within a pixel, and the color may thus be visible to a user of the display. On the other hand, when the voltage is applied to the pixel, the colored oil is displaced and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content. In addition, the lower power consumption of electrowetting displays in comparison to conventional LCD displays makes the technology suitable for displaying content on portable devices that rely on battery power.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the one or more displays 102 may represent a backlit display, examples of which are mentioned above.

In addition to including the one or more displays 102 and corresponding functionality, FIG. 1 illustrates that some examples of the device 100 may include one or more touch sensors 106 and corresponding touch controllers 108. In some instances, at least one touch sensor 106 resides with, or is stacked on, the display 102 to form a touch-sensitive display (e.g., an electronic paper touch-sensitive display). Thus, the display 102 may be capable of both accepting user touch input and rendering content in response to or corresponding to the touch input. As several examples, the one or more touch sensors 106 may comprise a capacitive touch sensor, a force sensitive resistance (FSR), an interpolating force sensitive resistance (IFSR) sensor, or any other suitable type of touch sensor. In some instances, the one or more touch sensors 106 are capable of detecting touches as well as determining an amount of pressure or force of these touches.

FIG. 1 further illustrates that the electronic device 100 may include lighting apparatus 110. As mentioned above, the lighting apparatus 110 may illuminate a front-lit or reflective display, or alternatively, provide a backlight illumination in the case of a backlit display. Several example components of the lighting apparatus 110 include one or more light sources 112 and corresponding light sources controllers 114. In addition, light apparatus 110 may include a lightguide 116 to propogate light from the one or more light sources towards the display 102. In some implementations, the lightguide 116 may include light directing areas formed on at least one surface of the lightguide 116 to direct the propogated light in a particular direction. Other components of the lighting apparatus 110, such as reflective materials, light absorbing materials, circuits, etc are omitted from this figure for the sake of clarity of illustration.

In some implementations, the lightguide 116 of the lighting apparatus 110 may receive light from one or the light sources 112 to provide illumination for the display. As one example, the lighting apparatus 110 may include a lightguide sheet as a lightguide 116 and one or more light sources 112. The lightguide 116 may comprise a substrate, such as of a transparent thermoplastic (e.g., PMMA (poly(methyl methacrylate)) or other acrylic, polycarbonate, etc.) or glass.

Additionally, FIG. 1 illustrates that the one or more light sources 112 may be positioned at various locations on the device while each may house one or more LEDs. Furthermore, FIG. 1 illustrates that the light sources 112 are located at four locations on the device; however, it is to be understood that any number of light sources 112 may be utilized (i.e., more than four or fewer than four).

In some implementations, the one or more light sources 112 may reside toward a bottom side 118 of the display 102 of the electronic device 100. By positioning the light sources 112 along the bottom side 118 of the display 102 relative to the content being displayed, light from the light sources 112 is generally directed away from a user consuming the content and, hence, is not directed into the user's eyes. For example, because users typically hold the electronic device 100 with a top side of the display 102 further away from the user's eyes than the bottom side 118 (i.e., with the top side tilted away from the user, given the user's line of sight to the top side), the light sources 112 positioned on the bottom edge 118 of the display 102 will generally shine towards the top side and away from the user's eyes. As such, positioning the light sources 112 in this manner may decrease the chances of the light being directed into a user's eyes. However, in other implementations, the one or more light source 112 may reside on any other side (i.e., top side, left side, and/or right side) of the display 118 of device 100.

In some implementations, each of the one or more light sources 112 may have a corresponding light source controller 114. In other implementations, the one or more light sources 112 may correspond to a single multi-way controller. In this implementation, the controller may be configured to independently control each of the light sources 112. For instance, the controller 114 may be a 4-way controller capable of independently controlling the electrical current supplied to the four light sources as illustrated in FIG. 1. In other implementations, where each light source contains multiple LEDs, the device 100 may have a multi-way controller corresponding to each light source so the electrical current supplied to each LED within each light source may be controlled independently of the other LEDs. In some implementations, an increase in electrical current provided by a light source controller may alter the light source by increasing the brightness of the LED within the light source. Conversely, a decrease in electrical current provided by a light source controller may alter the light source by decreasing the brightness of the LED within the light source.

FIG. 1 further illustrates that the electronic device 100 may include one or more hardware processors 120 and one or more computer-readable media 122, one or more network interfaces 124 and one or more power sources 126. The network interfaces 124 may support both wired and wireless connection to various networks, such as cellular networks, radio, WiFi networks, short range networks (e.g., Bluetooth®), infrared (IR), and so forth.

Depending on the configuration of the electronic device 100, the computer-readable media 122 (and other computer-readable media described throughout) is an example of computer storage media and may include volatile and nonvolatile memory. Thus, the computer-readable media 122 may include, but is not limited to, RAM, ROM, EEPROM, flash memory, or other memory technology, or any other medium that can be used to store computer-readable instructions, programs, applications, media items, and/or data which can be accessed by the electronic device 100. In some examples, the computer-readable media is a tangible non-transitory computer-readable media.

The computer-readable media 122 may be used to store any number of functional components that are executable on the processor 120, as well as content items 128 that are rendered by the electronic device 100. Thus, the computer-readable media 122 may include an operating system and data storage to store one or more content items 128, such as eBooks, audio books, songs, videos, still images, and the like. The computer-readable media 122 of the electronic device 100 may also store one or more content presentation applications (not shown) to render content items on the device 100. These content presentation applications may be implemented as various applications depending upon the content items 128. For instance, the content presentation application may be an electronic book reader application for rending textual electronic books, an audio player for playing audio books or songs, a video player for playing video, and so forth.

As illustrated, in this example the computer-readable media 122 includes or has access to feedback module 130 and a datastore 132, which in turn stores or has access to one or more event feedbacks 134(1), . . . , 134(N). Each of the event feedbacks 134(1)-(N) in the datastore 132 represents a unique event feedback (relative to one another) and comprises a schedule of instructions for performing the corresponding visual feedback for one or more events. That is, each event feedback 134(1)-(N) specifies for each event, a sequence of signals for the one or more light source controllers 114 to the one or more light sources 112, a start point on the display 102 and end point of on the display 102, and/or a time at which the visual feedback is to take place (e.g., 300 milliseconds). In some implementations, an event may include a page turn request on display 102, a request to open an application on the display 102, an indication of a completion of a download, an indication of an error message, an indication of low battery power, an indication of a selection of an input mechanism (i.e., button, knob, switch, dial, or the like) on the device 100 and/or any touch event detected by the touch sensor 106.

The feedback identification module 130, meanwhile, functions to select one of the event feedbacks 134(1)-(N) from the datastore 132 in response to identifying the type and/or location of an event on the device 100. For instance, when an event such as a page turn request is registered on the device by the user, the feedback identification module 130 may select a particular event feedback from the datastore and may issue the visual feedback instructions to the one or more light source controllers 114.

While FIG. 1 illustrates a few example components, the electronic device 100 may have additional features or functionality. For example, the device 100 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 100 may reside remotely from the device 100 in some implementations. In these implementations, the device 100 may utilize the network interfaces 124 to communicate with and utilize this functionality.

Figure 2:
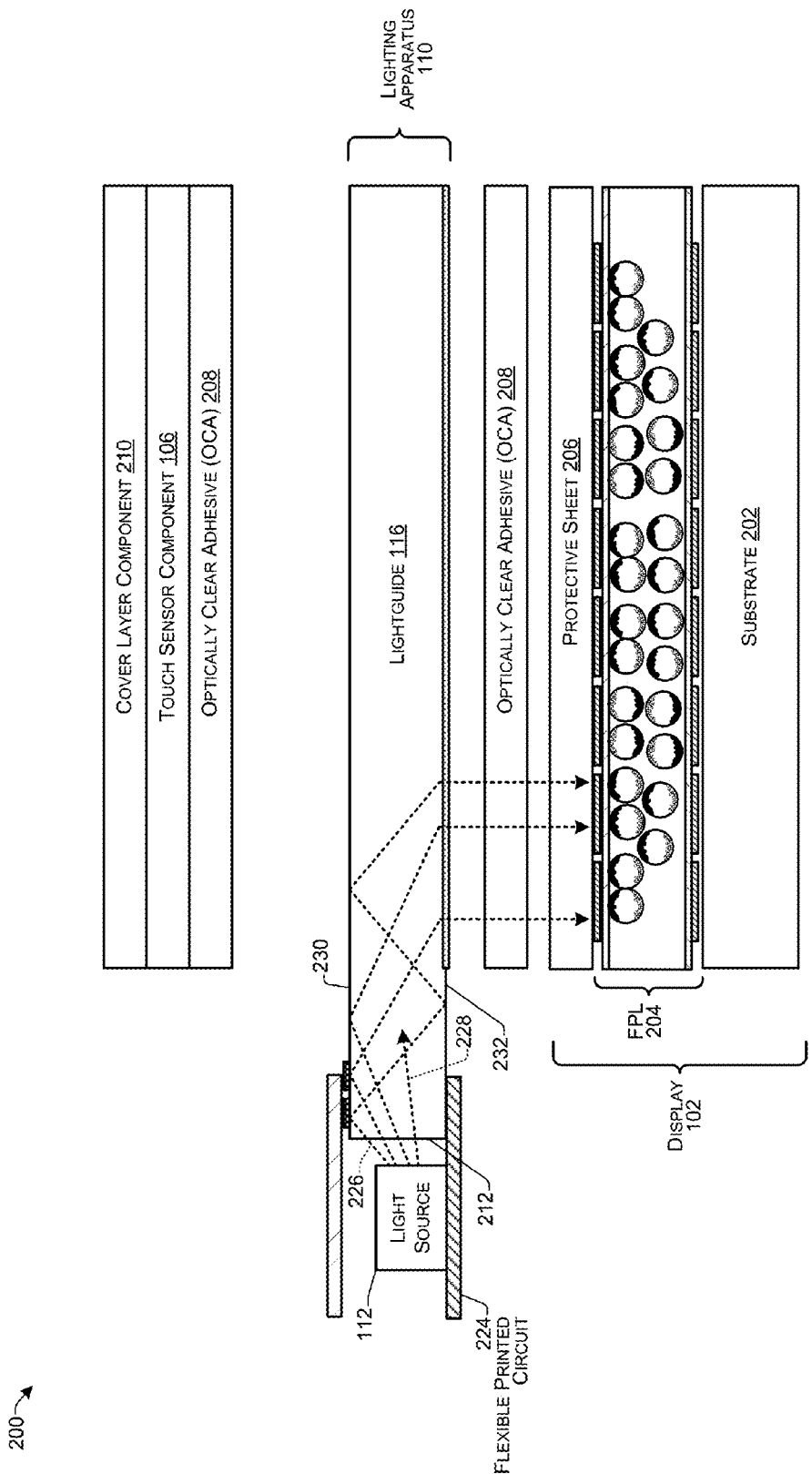
FIG. 2 illustrates an example schematic cross-section of a display assembly of the electronic device taken along line 2-2 of FIG. 1 according to some implementations.

FIG. 2 illustrates an example of a schematic cross-section of a component stack of a display assembly 200 of the electronic device 100 taken along line 2-2 from FIG. 1. A housing of the device 100 and other components of the device 100 described above are omitted from this figure for the sake of clarity of illustration. In this example, the display 102 is a reflective display that includes a substrate 202, such as of glass or other suitable material, a front plane laminate (FPL) 204, which serves as an image-displaying component, and a protective sheet 206. In some implementations, the FPL 204, may comprise e-ink capsules, as well as a fluid in which the capsules are suspended. As alternative example, in the case of an electrowetting display, the FPL 204 may include a plurality of pixel elements, each containing liquid subject to electrowetting activation such that voltage may be applied to individual pixel elements to modify the surface tension of the liquid and thereby change the appearance of the pixel element.

In the example of FIG. 2, a bottom surface of the lighting apparatus 110 is coupled to the protective sheet 206 by a layer of optically clear adhesive (OCA) 208, such as solid OCA (SOCA), liquid OCA (LOCA), or the like. Further, the touch sensor component 106 and a cover layer component 210 may be coupled to an upper surface of the lighting apparatus 110 by another layer of OCA 208.

Further, in some implementations, the touch sensor component 106 may be integral with the underside of the cover layer component 210. For instance, a transparent touch sensor electrode pattern may be formed on the underside of the cover layer component 210. As one example, a touch sensor electrode pattern may be a grid of linear transparent electrodes patterned onto the underside of the cover layer substrate to function as a capacitive touch sensor. In other implementations, the touch sensor component 106 may be a separate component, and may be located between the lightguide 116 and the display 102 and coupled thereto by OCA 208.

As described above, the lighting apparatus 110 includes the lightguide 116 and one or more light sources 112. In some implementations, the lightguide 116 may be a sheet of acrylic or other light-guiding material, and may have etchings, gratings or other patterns formed thereon as light directing areas for directing light from the light source 112 toward the display 102. Each light source 112 may include one or more LEDs or other suitable sources of illumination positioned to emit light toward at least one edge 212 of the lightguide 116.

In some implementations, the light source 112 may be coupled to a flexible printed circuit (FPC) 224, and the FPC 224 may be coupled to the lightguide 116 to at least partially form the lighting apparatus 110. The FPC 224 may provide electrical power and control to the light source(s) 112 and/or provide a communication medium between the light source(s) 112 and the one or more light source controllers 114. The light from the one or more light sources 112 may generally travel along the major plane of the lightguide 116 and the display 102 until the light contacts the grating elements in the light directing area, at which point the grating elements may direct the light downward toward the display 102. In some instances, the multiple LEDs of the light source(s) 112 may be positioned such that they collectively emulate a single point source. For instance, each LED may emit light over a particular angle that is in the shape of a cone or pyramid. The LEDs may be aligned and spaced (relative to one another and relative to an active area of the display) such that these triangles overlap in a manner so that the lighted display does not include overly bright spots or overly dim spots.

The electronic device 100 may also include a bezel (not shown in FIG. 2) optically connected to the other elements in stack 200. For instance, the bezel may couple to the cover layer component 210 or to another component in the stack via SOCA, LOCA or via any of various other means. The bezel may function to absorb stray light from the light source 112, thus helping to maintain the uniformity of the light emitted by the lighting apparatus 110 onto the display 102. To absorb light in this manner, in some instances the underside of the bezel may be black or another dark color. Additionally or alternatively, the device 100 may include black or dark adhesive, or other material, around the perimeter edges of the display stack to prevent light from escaping around the edges of the lighting apparatus 110.

Accordingly, the display assembly 200 of FIG. 2 provides a reflective display 102 having a front light and touch input capability. Further, while a particular example of a display assembly 200 has been described with respect to FIG. 2, numerous other display assembly configurations incorporating the lighting techniques herein will be apparent to those of skill in the art having the benefit of this disclosure.

FIG. 3 illustrates a partial plan view of light apparatus 110 including four light sources 112(1)-(4), of which, 112(1) and 112(2) are emitting light toward the edge 212 of the lightguide 116. In some implementation, light rays 300(1)-(N) and 302(1)-(N) may be emitted at various angles from LED 304 and LED 306 within light sources 112(1) and 112(2), respectively. For instance, light rays 300(1)-(N) may be emitted from the LED 302 toward the edge 212 of the lightguide 116 at any angle between 45 degrees either side of perpendicular.

In some implementations, the one or more light source controllers may alter the intensity of each of the one or more light source simultaneously or individually. For instance, the light source controller(s) may suspend, dampen or decrease the intensity of the light emitted from LED 304 within a light source 112(1) while simultaneously heightening, boosting or increasing intensity of the light emitted from LED 306 within a light source 112(2).

In some implementations, the one or more light source controllers 114 may instruct the LEDs to emit light rays such that a portion of the rays overlaps with a portion of another adjacent LEDs light rays 302. In addition, the light source controller 114 may instruct each LED of light sources 112 (1)-(4) to emit light rays independently of the other light sources. For instance, the one or more light source controllers 114 may instruct LED 304 to emit light rays 300(1)-(N) while refraining to instruction LED 306 to emit light rays 302(1)- (N). However, in other implementations and depending on the visual feedback required, the one or more light source controller may instruct the LEDs of each of the light source to illuminate simultaneously.

As mentioned above, each light source 112(1)-(4) may include a plurality of LEDs. In some implementations and as illustrated, the LEDs 304 and 306 may be blue light emitting LED, contained within a yellow-phosphor-containing substance 308. This arrangement may be referred to as a phosphor-based white LED. Due to the simplicity of manufacturing, the phosphor method is a popular method for making high-intensity white LEDs. As one example, the LEDs 304 and 306 may be an InGaN blue LED contained within a phosphor laden epoxy or other substance 308. A common yellow phosphor material is cerium-doped yttrium aluminum garnet (Ce3+:YAG).

In addition, FIG. 3 also illustrates an example configuration of the light directing area as grating elements 310 that may be present in the lightguide 116 such as on the upper surface, the bottom surface, or both. As one example, the grating elements may increase in density in the direction of light travel away from the light sources 112(1)-(4). This can cause the light to be directed toward the display 102 in a uniform manner.

Figure 4A:
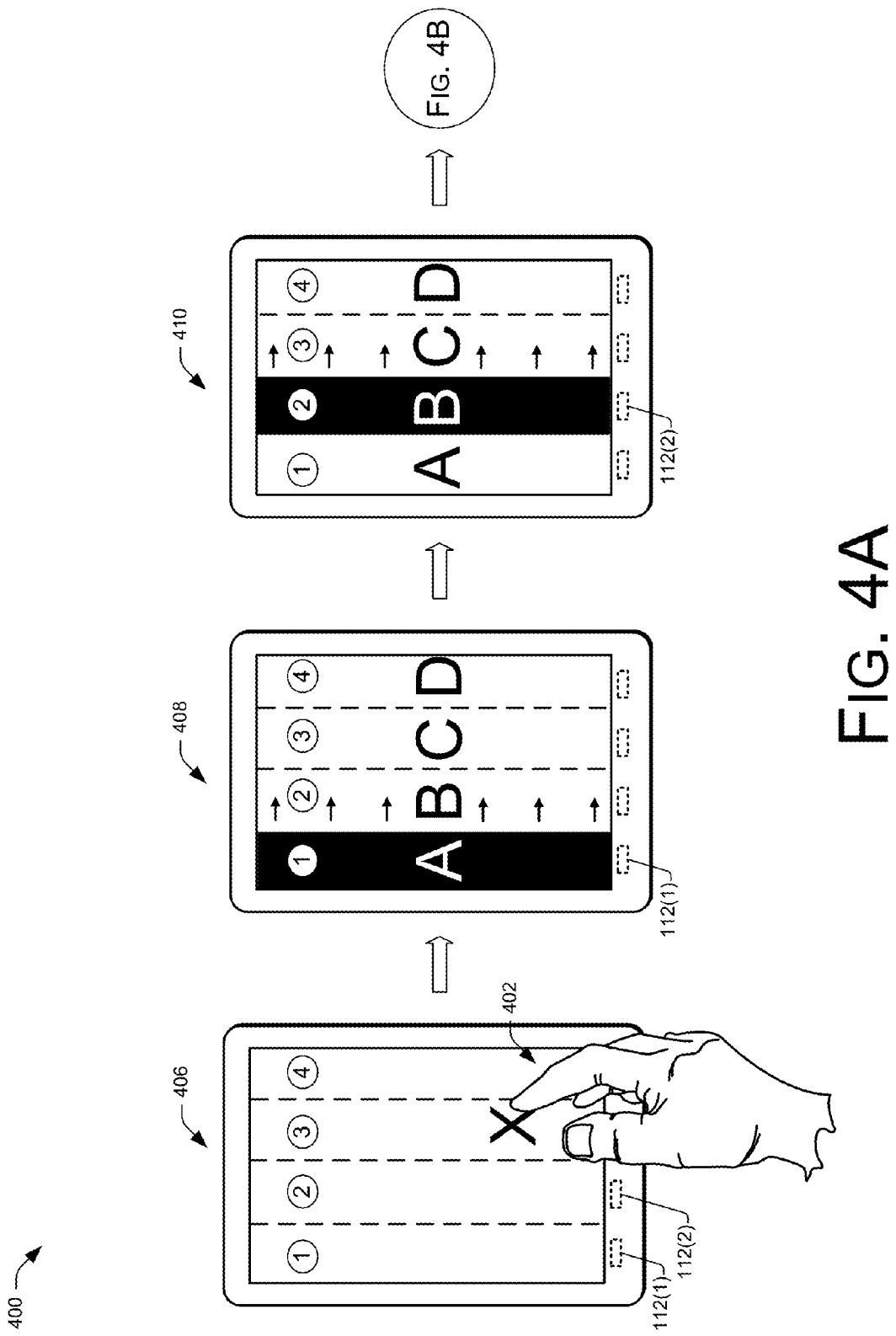
FIGS. 4A-4B illustrate an example flow diagram of the electronic device performing a visual feedback in response to receiving a user input.
Figure 4B:
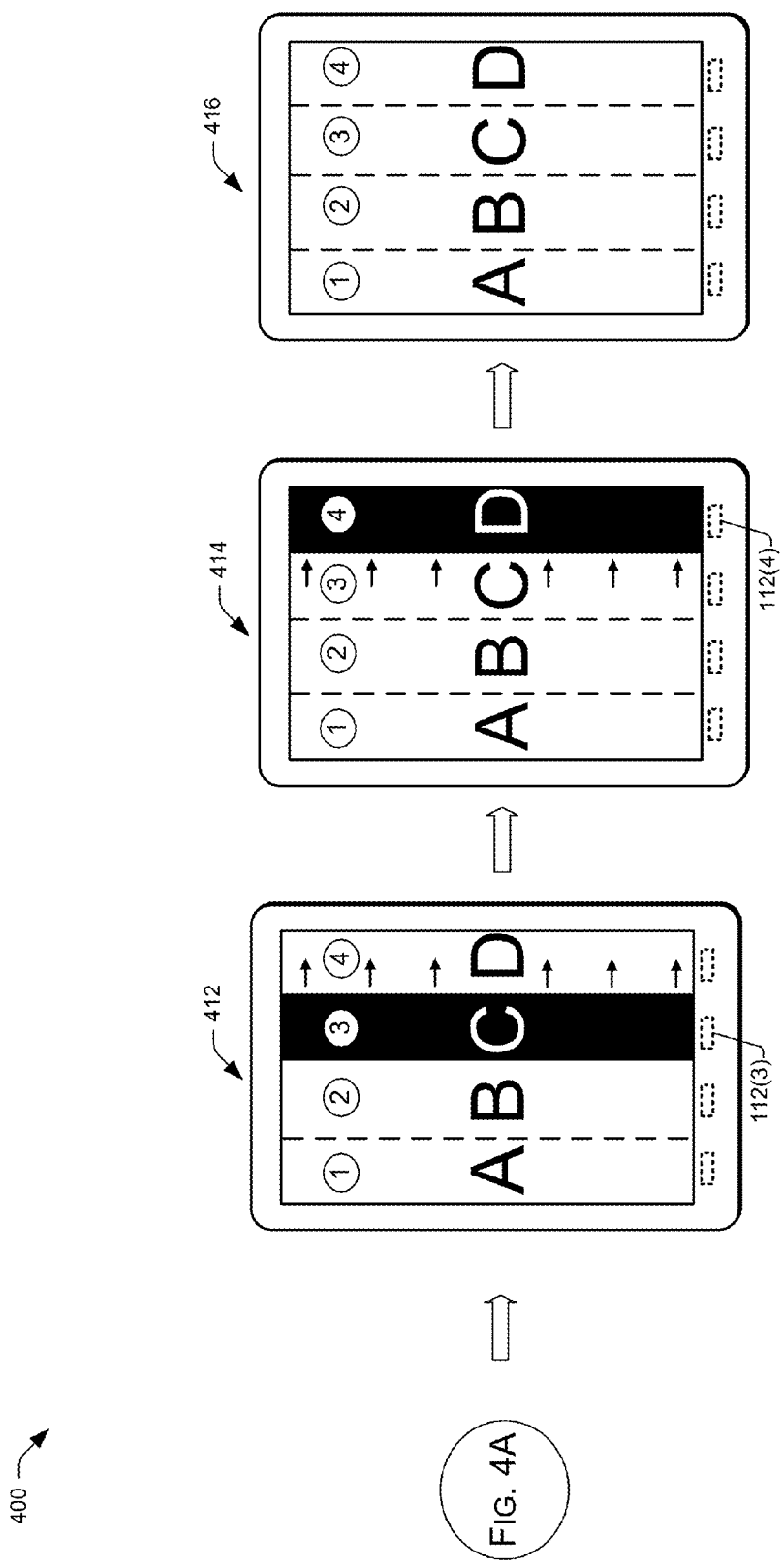

FIGS. 4A-4B illustrate an example flow diagram 400 of the electronic device 100 providing a sequence of a visual feedback in response to receiving an input 402 from a user (e.g., a request to render content on the display of the device). In some implementations, the sequence of the visual feedback illustrated in FIGS. 4A-4B may be completed within a predetermined time. For instance, the sequence may be initiated and completed in about 300 milliseconds. For illustration purposes the display of the electronic device 100 is divided into four sections labeled 1-4. Each of these sections is illustrated to correspond to a portion of the display primarily illuminated by a light source 112 located proximate to each section. For instance, one or more LEDs of light source 112 (1) may primarily illuminate section (1), while the one or more LEDs of light source 112(2) may primarily illuminate section (2), and so forth.

At 406, the electronic device receives an indication of a selection 402 from a user of a content item displayed on the display of the device. In this example, the user makes the selection 402 by touching the X on the display. The X may correspond to one of the content items 128 either stored on the device or accessed remotely through one of the network interfaces 124. In other implementations, the user may input the selection via a button on the device, a voice command, or via any other suitable input.

At 408, in response receiving the user selection of the content item, the display is updated to display the content item. For instance, a display controller 104 may instruct an update of the relevant pixels of the electronic paper display in any of the methods described above. In this example, the display render a page of an electronic book comprising the first four letters of the English alphabet: A B C D. Furthermore, upon receiving the user selection, the feedback identification module 130 may identify the selection as a request to open the electronic book and search the datastore 132 for a corresponding event feedback 134(1)-(N). The event feedback that corresponds to the selection of the electronic book may store the instruction to provide the sequence of a visual feedback from the one or more light sources. In this example, the instruction may initiate a visual feedback sequence by instructing a light source controller 114 to temporarily suspend or dampen the illumination of the LED of light source 112(1) to decrease illumination of section (1) on the display. While the LEDs of light sources 112(2)-(4) continue to illumination each of their corresponding section on the display.

The sequence of the visual feedback on the device 100 continues at 410. At 410, light source 112(1) previously suspended at 408, receives an instruction from the light source controller 114 to resume illumination of section (1) on the display. While the same or different light source controller 114 may temporarily suspend the LED of light source 112(2) to decrease illumination of section (2) on the display. As mentioned above, each light source 112(1)-(4) may be controlled by one or more light source controllers 114. In some implementations, each light source 112(1)-(4) may be controlled by a single controller. For instance, the single controller may be a four-way controller capable of independently controlling each of the light sources relative to another light source and simultaneous controlling a plurality of the light sources. In other implementations, the device may have a dedicated light source controller for each of the one or more light sources.

At 412, the visual feedback sequence may continue by resuming illumination of the previously suspended light source 112(2) at 410. While the light source controller 114 may temporarily suspend the LED of light source 112(3) to decrease illumination of section (3) on the display. In some implementations, the sequence that suspends and resumes the illumination of each adjacent section may overlap in a manner such that the visual feedback in the form of light appears to seamlessly roll across the display. For instance, in this implementation, the light may appear to roll from a left side of the display toward a right side of the display.

At 414, the sequence may continue by resuming illumination of the previously suspended light source 112(3) at 412. While the light source controller 114 may temporarily suspend the LED of light source 112(4) to decrease illumination of section (4) on the display.

At 414, the sequence may conclude by resuming illumination of the previously suspended light source 112(4) at 414. In some implementations, each of the light sources 112(1)-(4) may illuminate the corresponding sections of the display of the device 100 simultaneously. As mentioned above, the rate of transitions between each of steps of the sequence of providing the visual feedback for the user selection 402 as described in FIGS. 4A-4B may allow the content item on the display on the device to remain visible to the user.

In some implementations, one or more light source controller may alter each of the one or more light sources in a manner other than suspending and/or resuming illumination of each light source. For instance, as mentioned above, the light source controller(s) may boost, heighten, depress or dampen the illumination of one of the light sources while the illumination of the adjacent light sources remain at a constant level or are adjusted upwards and/or downwards.

Figure 5:
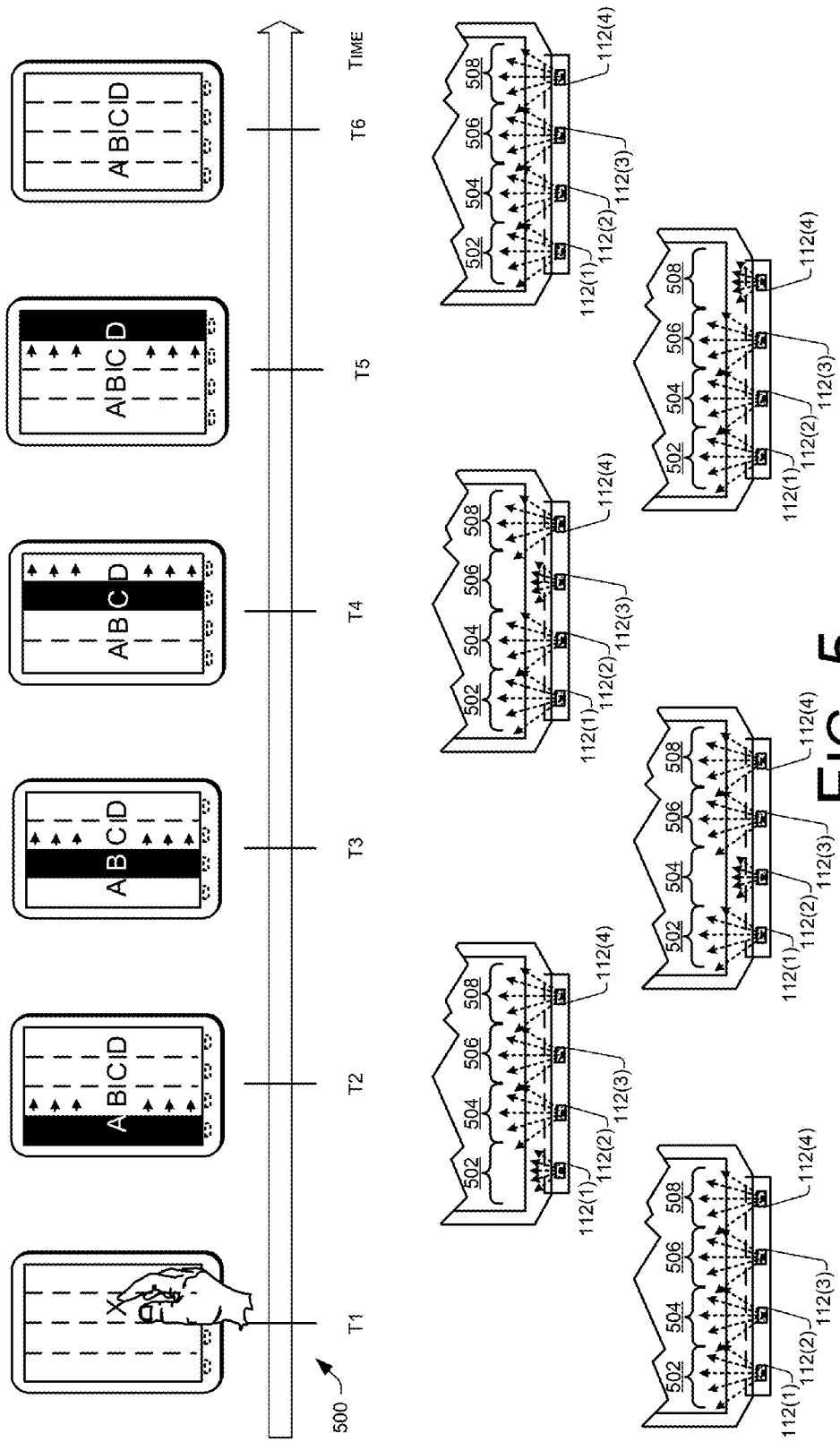
FIG. 5 illustrates another example flow diagram performing a visual feedback by independently controlling the one or more light sources of the lighting apparatus in response to receiving a touch input on the electronic device.

FIG. 5 illustrates an example timeline 500 of the device 100 providing a visual feedback in response to receiving an input from a user such as user input 402 illustrated in FIG. 4A. In this example, the illustrations above the timeline 500 represent the display of the content item on the device as the light sources provide the visual feedback as described above with regard to FIGS. 4A-4B. The illustrations below the timeline 500, meanwhile, represent the level of illumination of each of the LEDs of the light sources during the sequence of providing the visual feedback.

At a first time T1, the device receives an indication of a selection from a user on the display of the device. In this example, the device receives an indication that the user has selected the X on the display of the device. As illustrated below the timeline, each of the light sources 112(1)-(4) may be instructed by the light source controller(s) to emit light rays 502, 504, 506, and 508, respectively. In addition, the light rays from each of the light sources 112(1)-(4) are simultaneously emitted at a same or similar intensity.

At a time T2, the display of the device is updated to display content in response to receiving the selection from the user. For instance, the electronic paper display is updated by the display controller to display the content item such as an electronic book. In addition, the feedback identification module 130 may identify the corresponding event feedback 134(1)-(N) from the datastore that corresponds to the received selection from the user. In identifying the specific feedback event, the feedback identification module 130 may gather the specific instruction associated with the specific event feedback sequence instructions to initiate the visual feedback on the display of the device.

As shown below the timeline 500 at time T2, in response to identifying the specific feedback event associated with the user selection at time T1, the sequence of providing the visual feedback is initiated at the light sources 112(1)-(4). In this example, the visual feedback provides an appearance of progressive motion of dimness from a left side of the display toward the right side of the display. As illustrated, the light rays 502 of light source 112(1) may have been suspended or dampened as compared to the light rays 504, 506 and 508 by a light source controller configured to independently alter the activation of each light source. Thus, the correspond section of the display (i.e., the section displaying "A") illuminated by light source 112(1) may temporarily appear to be less bright than the other section of the display.

At a time T3, the visual feedback sequence continues. As shown below timeline 500, the light rays 504 emitted from light source 112(2) may next be suspended or dampened while the light rays 502 may be altered to a level commensurate with the light rays 506 and 508 of light source 112(3) and 112(4), respectively. Thus, the section corresponding to light source 112(2) (i.e., the section displaying "B") may temporarily appear to be less bright that the other section of the display.

At a time T4, as shown below timeline 500, the light rays 506 emitted from light source 112(3) may next be suspended or dampened while the light rays 504 may be altered to a level commensurate with the light rays 502 and 508 of light source 112(1) and 112(4), respectively. Thus, the section corresponding to light source 112(3) (i.e., the section displaying "C") may temporarily appear to be less bright that the other section of the display.

At a time T5, as shown below timeline 500, the light rays 508 emitted from light source 112(4) may next be suspended or dampened while the light rays 506 may be altered to a level commensurate with the light rays 502 and 504 of light source 112(1) and 112(2), respectively. Thus, the section corresponding to light source 112(4) (i.e., the section displaying "D") may temporarily appear to be less bright that the other section of the display.

At a time T6, as shown below timeline 500, the light rays 508 may be altered to a level commensurate with the light rays 502, 504 and 506 of light source 112(1), 112(2), and 112(3), respectively. As a result, each section (i.e., the sections displaying "A, B, C, and D") of the display may illuminate the content item with a uniform brightness. In some implementations, as described above, the entire timeline 500 may occur in an amount of time such that the content item display on device 100 remains visible to the user. In some implementations, the length of time of each time described in timeline 500 is the same; however, on some implementations, the length of time for each time may vary. Furthermore, the light rays emitted from each light source 112(1)-(4) are illustrated to overlap. Also, as mentioned above, such an overlap may further allow each section of the display to at least partly remain illuminated throughout the times of timeline 500. Thus, allowing the content item display on the device to remain visible during the visual feedback sequence.

Figure 6:
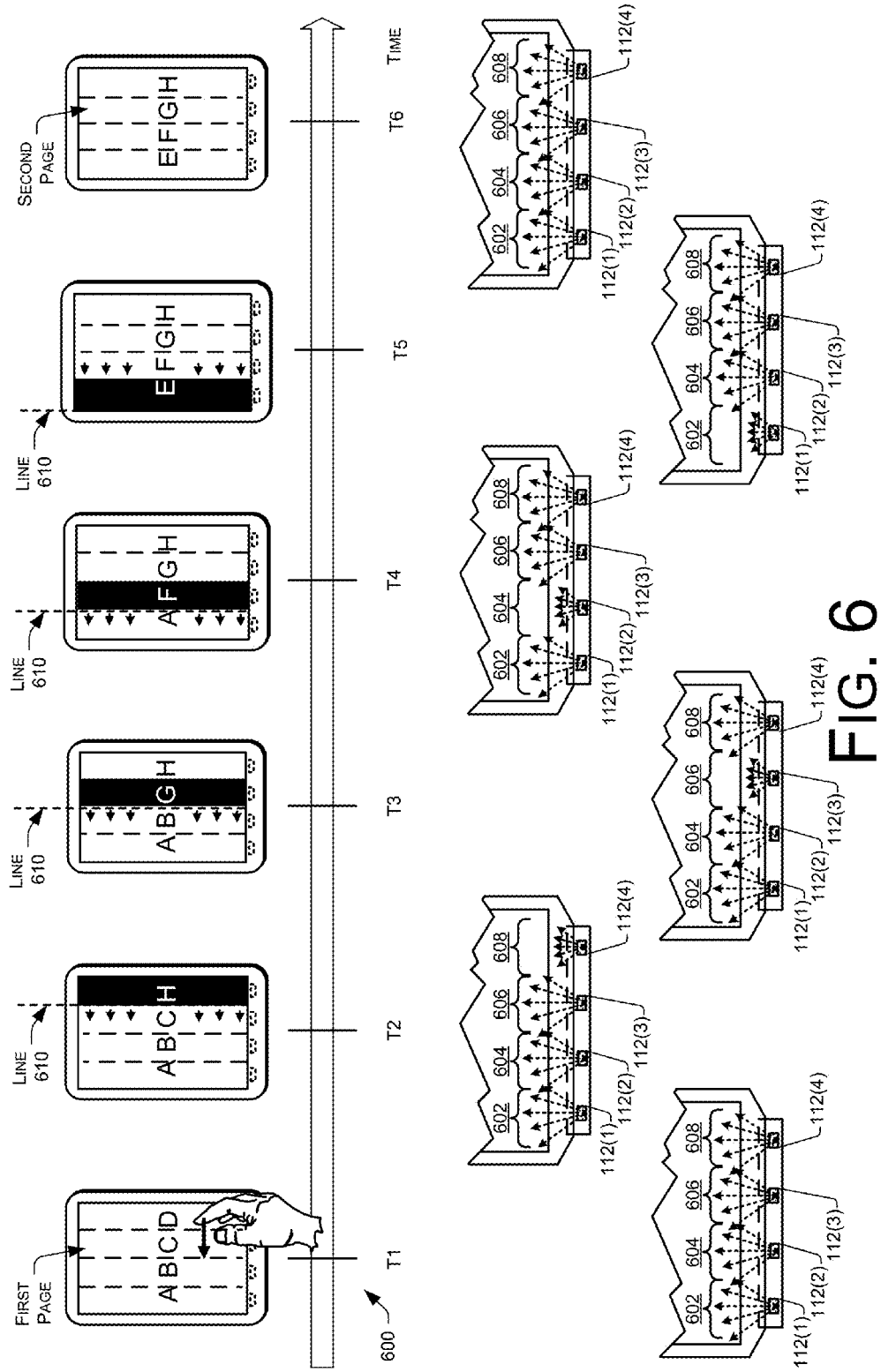
FIG. 6 illustrate another example flow diagram of performing a visual feedback by independently controlling the one or more light sources of the lighting apparatus in response to receiving a request to transition between pages of an electronic book on the electronic device.

FIG. 6 illustrates an example timeline 600 of the device 100 providing a visual feedback in response to receiving another example input from a user. In this example, input from the user may be a request to navigate from a first page of a content item (e.g., an electronic book) to a second page. In some implementations, the visual feedback may be provided in conjunction with an update of the content displayed by the electronic paper display. In some implementations, the visual feedback of light may also provide an indication of the direction of navigation from the first page to the second page (e.g., from left to right, right to left, top to bottom or bottom to top). In addition, in this example the update to the display itself occurs from one side of the display to an opposite side, also indicating the direction of navigation from the first page to the second page. That is, both the light and the update may appear to "roll" across the display, thus simulating a page turn from one page of a physical book to the subsequent page.

The illustrations above the timeline 600 represent the user's interaction with the device 100, the content rendered on the display and an example indication of the visual feedback on the display. The illustration below the timeline 600, meanwhile, represents the illumination of each of the LEDs of the light sources during the example times of the sequence of providing the visual feedback.

At a first time T1, the device 100 renders content of a first page of a content item such as an electronic book. As mentioned above in FIG. 4A, the first page of the electronic book may comprise the first four letters of the English alphabet: A B C D. In addition, the device receives an indication of a user input on the device. As illustrated, the user input may comprise a swiping gesture across the display. In other implementations, the user input may be any other touch input on the device such as, for example, a user touch within a predetermined area of the display. In some implementations, the feedback identification module 130 may identify the corresponding event feedback 134(1)-(N) from the datastore that corresponds to the received user input. In identifying the specific feedback event, the feedback identification module 130 may gather the instructions to initiate the specific visual feedback on the display of the device in response receiving the request to navigate from the first page of the electronic book to the second page.

As shown below the timeline 600, each of the light sources 112(1)-(4) may be instructed by the light source controller(s) to emit light rays 602, 604, 606, and 608, respectively to illuminate the first page of the electronic book. In addition, the light rays from each of the light sources 112(1)-(4) are simultaneously emitted at a similar intensity.

At a time T2, the display controller has updated the display with content from the second page of the electronic book behind line 610, while the display continues to render content from the first page on the opposite side of the line 610. In some implementations, as illustrated below the timeline 600, the sequence of providing the visual feedback of a page turn is initiated at the light sources 112(1)-(4). In this example, the visual feedback provides an appearance of progressive motion of illumination from a right side of the display toward the left side of the display. As illustrated, the light rays 608 of light source 112(4) may have been suspended or dampened as compared to the light rays 602, 604 and 606 by a light source controller configured to independently alter the activation of each light source. Thus, the correspond section of the display illuminated by light source 112(4) and, in some instance, displaying the content from the second page of the electronic book may temporarily appear to be less bright than the other section of the display.

At a time T3, the display controller continues to update the display from right to left with content from the second page of the electronic book along the line 610. As shown below timeline 600, the visual feedback sequence may continue by suspending or dampening the light rays 606 emitted from light source 112(3) while altering the light rays 608 to a level commensurate with the light rays 602 and 604 of light source 112(1) and 112(2), respectively. Thus, the section corresponding to light source 112(3) (i.e., the section displaying "G" of the second page of the electronic book) may temporarily appear to be less bright that the other section of the display.

At a time T4, line 610 is shown as continuing to progress across the display as the display controller updates the content behind the line 610 to render the content from the second page of the electronic book. As shown below the timeline 600, the visual feedback sequence may continue by suspending or dampening the light rays 604 emitted from light source 112(2) while altering the light rays 606 previously suspended or dampened at T3 to a level commensurate with the light rays 602 and 608 of light source 112(1) and 112(4), respectively. Thus, the section corresponding to light source 112(2) (i.e., the section displaying "F" of the second page of the electronic book) may temporarily appear to be less bright that the other section of the display.

At a time T5, the display controller updates the remaining portion of the display with the content on the second page of the electronic book. Meanwhile, the light source controller(s) 114 may instruct the light source 112(1) to suspend or dampen the light rays 602. Furthermore, the light source controller may instruct the light source 112(2) with previously suspended or dampened rays 604 at time T4 to resume emitting the rays at a level similar to rays 606 and 608 of light source 112(3) and 112(4), respectively. Thus, the section corresponding to light source 112(1) (i.e., the section displaying "E" of the second page of the electronic book) may temporarily appear to be less bright that the other section of the display.

At a time T6, the display controller completes the update on the display of the device 100. As illustrated, the display now shows the entire content of the second page of the electronic book. In addition, as shown below timeline 600, the previously suspended or dampened light rays 602 may be altered to a level commensurate with the light rays 604, 606 and 608 of light source 112(2), 112(3), and 112(4), respectively. As a result, each section (i.e., the sections displaying "E, F, G, and H of the second page of the electronic book") of the display may illuminate the content with a uniform brightness.

Figure 7:
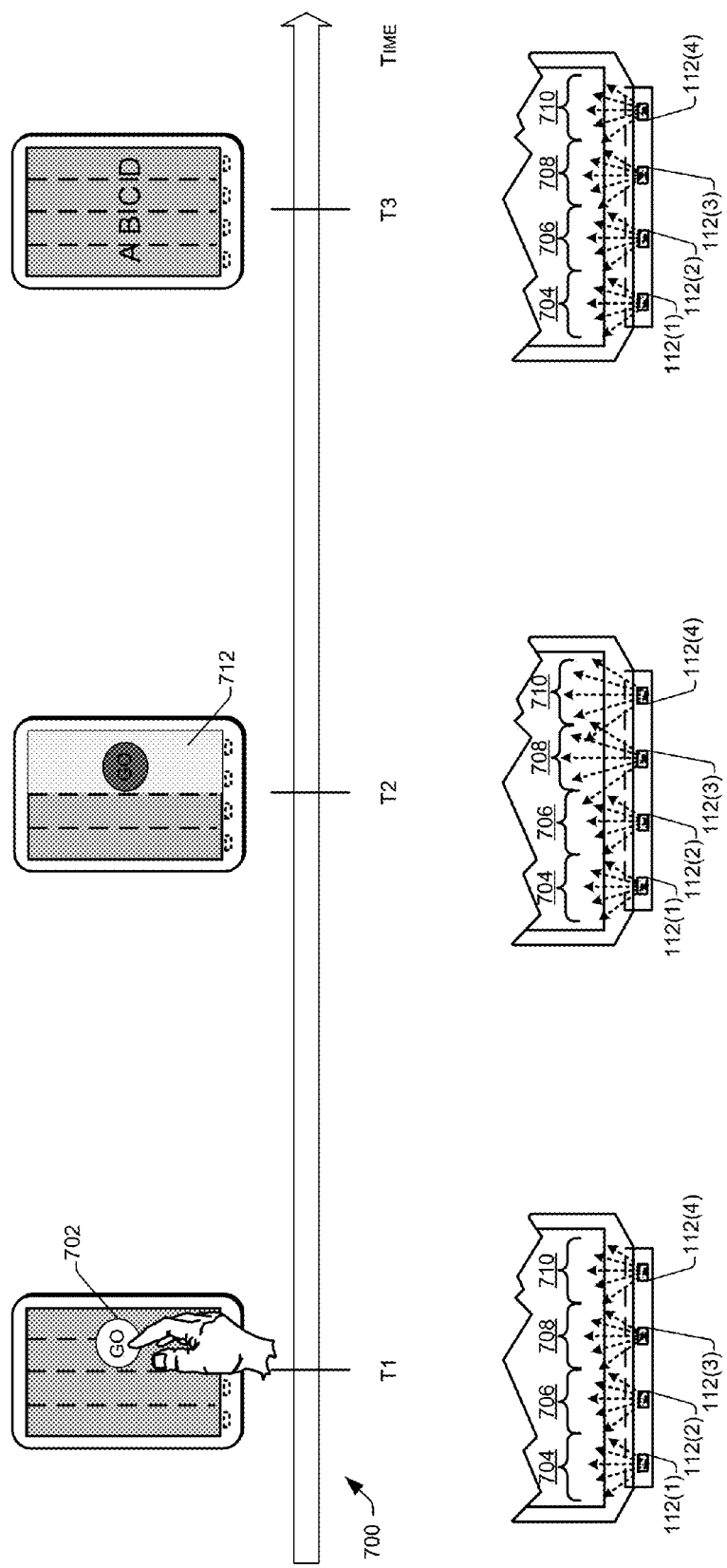
FIG. 7 illustrates another example flow diagram of providing a visual feedback in response to receiving another example input from a user, in this case the user selecting an icon on a touch screen of the device.

FIG. 7 illustrates an example timeline 700 of the device 100 providing a visual feedback in response to receiving another example input from a user. In this example, input received from a user may be a request to access an electronic book. In some implementations, the visual feedback may be provided on a portion of the display. For instance, over a portion of the display corresponding to an area display the selected content item.

The illustrations above the timeline 700 represent the user's interaction with the device 100, the content rendered on the display and an example indication of the visual feedback on the display. The illustration below the timeline 700, meanwhile, represents the illumination of each of the LEDs of the light sources during the example times of the sequence of providing the visual feedback.

At a first time T1, the device 100 may present an icon 702 representing a content item that the user requests to access. In some implementation, upon selection of the icon 702 the device may open and present the content item. In some implementations, the input from the user may be a touch input on the display of device 100, as illustrated at T1; however, in other implementations, the input may be a received from a button, or other physical input located on the device, or any other type of input (e.g., audible). As mentioned above, the content item may be an electronic book, application, or other content item.

In some implementations, the feedback identification module 130 may identify the corresponding event feedback 134(1)-(N) from the datastore that corresponds to the received user input. For instance, the feedback identification module 130 may identify a location of icon 702 on the display of device 100. In identifying the specific feedback event and location, the feedback identification module 130 may gather the instructions to initiate the specific visual feedback on a portion 712 of the display of the device displaying icon 702 in response receiving the request to open the content item.

As shown below the timeline 700, each of the light sources 112(1)-(4) may be instructed by the light source controller(s) to emit light rays 704, 706, 708, and 710, respectively to illuminate the display of the device. In addition, the light rays from each of the light sources 112(1)-(4) are simultaneously emitted at a similar intensity.

At a time T2, the visual feedback that the selection of icon 702 is presented to on the display. In this example, the visual feedback presents an increase illumination of the portion 712 of the display corresponding to the location of icon 702 of the requested content item. As illustrated below the timeline 700, the visual feedback may include instruction the light source controller to provide additional electrical current to the light source 112(3) and 112(4). As a result, the light rays 708 and 710 may be heighten to provide additional illumination or brightness over portion 712 of the display, while the light source controller may maintain the brightness of the light rays of 704 and 706 from light sources 112(1) and 112(2) from time T1 to time T2.

At a time T3, the display controller may update the display to render the content item of selected icon 702. As shown, the display of device 100 now displays the text A B C D of an example electronic book. As shown below the timeline 700, the previously heightened light rays 708 and 710 of light sources 112(3) and 112(4), respectively, may be adjusted to a level commensurate with light rays 704 and 706 of light sources 112(1) and 112(2). In this example, the light source controller may reduce the electrical current supplied to light sources 112(3) and 112(4) to a level similar to light sources 112(1) and 112(2). As a result, the displayed content item may be illuminated with a uniform brightness.

Figure 8:
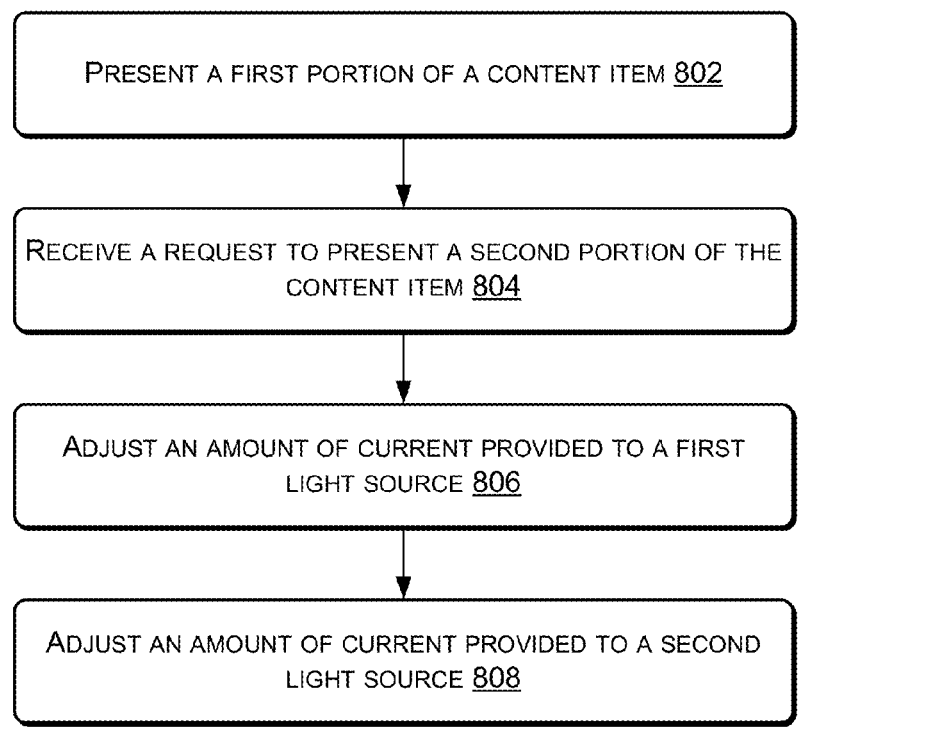
FIG. 8 illustrates an example process for providing a visual feedback in accordance with embodiments discussed below.

FIG. 8 illustrates an example process 800 for providing visual feedback on a display of an electronic device that includes a lighting apparatus to illuminate a reflective display. At 802, the device presents a first portion of a content item on the display, such as a first page of an electronic book. At 804, the device receives a request to present a second portion of the content item on the display. For instance, a user may provide any sort of input on the device instructing the device to present the second portion. At 806, and at least partly in response to receiving the request, the device may adjust an amount of current provided to a first light source of the lighting apparatus. At 808, the device may, at least partly after adjusting the amount of current provided to the first light source, adjust an amount of current provided to a second light source of the lighting apparatus.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. An electronic device comprising:
a reflective display configured to present a first page of a content item;
a lightguide positioned above the reflective display configured to direct light toward the reflective display;
first and second adjacent light sources positioned at one or more edges of the lightguide, each light source configured to provide light to a portion of the lightguide;
a light source controller configured to control the first and second light sources independent of each other;
one or more processors;
memory, accessible by the one or more processors; and
one or more modules maintained in the memory, which when executed by the one or more processors cause the one or more processors:
receive an input to present a second page of the content item on the reflective display; and
send instructions, based at least in part on the received input, to the light source controller instructing the light source controller to, in a pre-determined order, one of raise or lower an amount of current provided to the first light source and the other of raise or lower an amount of current provided to the second light source.

2. The electronic device as recited in claim 1, wherein the instructions further instruct the light source controller to sequentially adjust the amount of current provided to the first light source and the amount of current provided to the second light source over a pre-determined amount of time.

3. The electronic device as recited in claim 1, wherein the instructions further instruct the light source controller to adjust, while the reflective display is being updated to present the second page of the content item, the amount of current provided to each light source.

4. A device comprising:
a reflective display;
a plurality of light sources, each light source of the plurality configured to light a portion of the reflective display;
at least one light source controller to control the plurality of light sources;
one or more processors;
one or more computer-readable media storing computer-executable instructions that, when executed on the one or more processors, cause the one or more processors to perform acts comprising:
receiving an indication that a user has provided an input on the device;
determining an event associated with the input;
selecting an event feedback associated with the event; and
instructing the at least one light source controller to adjust an amount of current provided to the plurality of light sources to generate the event feedback.

5. The device as recited in claim 4, wherein the instructing further comprises instructing the at least one light source controller to adjust, over a pre-determined amount of time, an amount of current provided to each light source of the plurality.

6. The device as recited in claim 4, wherein the instructing further comprises instructing the at least one light source controller to adjust an amount of current provided to each light source in a sequence that begins on a first side of the device and ends at a second, opposite side of the device.

7. The device as recited in claim 4, wherein the instructing further comprises instructing the at least one light source controller to adjust, while the reflective display is updated, an amount of current provided to each light source of the plurality.

8. The device as recited in claim 4, wherein the instructing comprises at least one of:
instructing the at least one light source controller to cease providing current to at least one light source;
instructing the at least one light source controller to decrease an amount of current provided to at least one light source; or
instructing the at least one light source controller to increase an amount of current provided to at least one light source.

9. The device as recited in claim 4, further comprises a lightguide for directing light from the plurality of light sources toward the reflective display.

10. The device as recited in claim 4, further comprising one or more touch sensors adjacent to the reflective display to form a touch-sensitive reflective display, and wherein the input comprises a touch input on the touch-sensitive reflective display.

11. The device as recited in claim 4, wherein each light source of the plurality comprises at least one light-emitting diode (LED).

12. A method comprising:
under control of an electronic device that includes a lighting apparatus to illuminate a reflective display, the lighting apparatus including a first and second light source,
presenting a first portion of a content item on the reflective display;
receiving a request to present a second portion of the content item on the reflective display;
at least partly in response to receiving the request:
adjusting an amount of current provided to the first light source to one of increase or decrease the amount of current provided to the first light source; and
at least partly after adjusting the amount of current provided to the first light source, adjusting an amount of current provided to the second light source to the other of increase or decrease the amount of current provided to the second light source.

13. The method as recited in claim 12, further comprising updating the reflective display to present the second portion at least partly in response to receiving the request, and wherein at least one of the adjusting the amount of current provided to the first light source or the adjusting of the amount of current provided to the second light source occurs at least partly during the updating.

14. The method as recited in claim 12, wherein the reflective display comprises an electronic paper display or an electrowetting display.

15. The method as recited in claim 12, wherein the adjusting of the amount of current provided to the second light source occurs before the adjusting of the amount of current provided to the first light source has ceased.

16. The method as recited in claim 12, wherein at least one of the adjusting of the amount of current provided to the first light source or the adjusting of the amount of current provided to the second light source comprises:
   decreasing an amount of current provided to the respective light source from a first amount to a second amount and increasing the amount of current provided from the second amount back to the first amount; or
   increasing an amount of current provided to the respective light source from a first amount to a second amount and decreasing the amount of current provided from the second amount back to the first amount.

17. The method as recited in claim 12, wherein an amount of time over which the amount of current provided to the first and second light sources are adjusted is based at least in part on an amount of time over which the reflective display is updated to transition from presenting the first portion of the content item to the second portion of the content item.

18. The method as recited in claim 12, wherein the lighting apparatus further comprises a lightguide configured to receive light from the each light source and direct the received light toward the reflective display.

19. A device comprising:
   a reflective display;
   one or more touch sensors configured to accept touch inputs from a user;
   a plurality of light sources, each light source of the plurality of light sources lighting a portion of the reflective display;
   at least one light source controller to control the plurality of light sources;
   one or more processors;
   one or more computer-readable media storing computer-executable instructions that, when executed on the one or more processors, cause the one or more processors to perform acts comprising:
      receiving a first touch input at the one or more touch sensors;
      determining a first event associated with the first input;
      selecting a first event feedback associated with the first event; and
      instructing the at least one light source controller to increase a brightness of a first subset of the plurality of light sources and to decrease a brightness of a second subset of the plurality of light sources to produce the first event feedback.

20. The device as recited in claim 19, wherein the plurality of light sources is configured to emit light toward one or more edges of a lightguide, and the lightguide is positioned above the reflective display for directing the light emitted from the plurality of light sources toward the reflective display.

21. The device as recited in claim 19, further comprising:
   receiving a second touch input at the one or more touch sensors;
   determining a second event associated with the second input;
   selecting a second event feedback associated with the second event; and
   instructing the at least one light source controller to increase a brightness of a third subset of the plurality of light sources and to decrease a brightness of a fourth subset of the plurality of light sources to produce the second event feedback.

* * * * *